United States Patent
Kim et al.

(10) Patent No.: US 12,514,298 B2
(45) Date of Patent: Jan. 6, 2026

(54) AEROSOL GENERATING DEVICE WITH A CONTROLLER SETTING HEATING TARGET TEMPERATURE BASED ON SENSOR OUTPUT AND METHOD FOR OPERATING THE SAME

(71) Applicant: KT&G CORPORATION, Daejeon (KR)

(72) Inventors: Yong Hwan Kim, Gyeonggi-do (KR); Sung Wook Yoon, Gyeonggi-do (KR); Seung Won Lee, Gyeonggi-do (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 718 days.

(21) Appl. No.: 17/270,757

(22) PCT Filed: Dec. 14, 2020

(86) PCT No.: PCT/KR2020/018250
§ 371 (c)(1),
(2) Date: Feb. 23, 2021

(87) PCT Pub. No.: WO2021/167217
PCT Pub. Date: Aug. 26, 2021

(65) Prior Publication Data
US 2023/0013486 A1    Jan. 19, 2023

(30) Foreign Application Priority Data

Feb. 18, 2020   (KR) .................. 10-2020-0019997

(51) Int. Cl.
*A24F 40/57* (2020.01)
*A24F 40/20* (2020.01)
(Continued)

(52) U.S. Cl.
CPC .............. *A24F 40/57* (2020.01); *A24F 40/20* (2020.01); *A24F 40/51* (2020.01); *A24F 40/53* (2020.01);
(Continued)

(58) Field of Classification Search
CPC .......... A24F 40/57; A24F 40/20; A24F 40/51; A24F 40/53; A24F 40/65; A24F 40/50;
(Continued)

(56) References Cited

U.S. PATENT DOCUMENTS 10,159,283 B2   12/2018  Mironov
11,325,501 B2*   5/2022  Robert ...................... H02J 7/02
(Continued)

FOREIGN PATENT DOCUMENTS

EP     3 342 442 A1   7/2018
EP     3406148 A1     11/2018
(Continued)

OTHER PUBLICATIONS

Extended European Search Report dated Oct. 5, 2021 in European Application No. 20859637.9.
(Continued)

*Primary Examiner* — Justin M Kratt
(74) *Attorney, Agent, or Firm* — Sughrue Mion, PLLC

(57) ABSTRACT

An aerosol generating device may include a housing forming an exterior of the aerosol generating device; a heater configured to heat an aerosol generating article inserted through a first surface of the housing; a battery electrically connected to the heater; a weather information sensor exposed through a second surface of the housing and configured to measure weather information surrounding the housing; and a controller configured to adjust power supplied from the battery to the heater, wherein the controller is further configured to control an amount of the power sup-
(Continued)

plied from the battery to the heater such that the heater is heated according to at least one from among a target temperature of a pre-heating section and a target temperature of a smoking section that is determined.

14 Claims, 3 Drawing Sheets

(51) Int. Cl.
| | |
|---|---|
| *A24F 40/51* | (2020.01) |
| *A24F 40/53* | (2020.01) |
| *A24F 40/65* | (2020.01) |
| *H01M 10/48* | (2006.01) |
| *H05B 1/02* | (2006.01) |
| *A24F 40/50* | (2020.01) |
| *G01W 1/02* | (2006.01) |
| *G01W 1/04* | (2006.01) |
| *G01W 1/06* | (2006.01) |

(52) U.S. Cl.
CPC ............ *A24F 40/65* (2020.01); *H01M 10/486* (2013.01); *H05B 1/0252* (2013.01); *A24F 40/50* (2020.01); *G01W 1/02* (2013.01); *G01W 1/04* (2013.01); *G01W 1/06* (2013.01); *H01M 2220/30* (2013.01)

(58) Field of Classification Search
CPC ............ H01M 10/486; H01M 2220/30; H05B 1/0252; G01W 1/02; G01W 1/04; G01W 1/06
See application file for complete search history.

(56) References Cited

U.S. PATENT DOCUMENTS

| | | |
|---|---|---|
| 2018/0043114 A1 | 2/2018 | Bowen et al. |
| 2018/0093054 A1 | 4/2018 | Bowen et al. |
| 2018/0140008 A1 | 5/2018 | Sur et al. |
| 2018/0177227 A1 | 6/2018 | Vouillamoz et al. |
| 2018/0263289 A1 | 9/2018 | Qiu |
| 2018/0271159 A1 | 9/2018 | Memari et al. |
| 2019/0313695 A1 | 10/2019 | Kaufman et al. |
| 2020/0008466 A1* | 1/2020 | Ouyang ............... H05B 1/0297 |
| 2021/0145068 A1* | 5/2021 | Bessant ................... A24F 40/95 |

FOREIGN PATENT DOCUMENTS

| | | |
|---|---|---|
| JP | 2019-521739 A | 8/2019 |
| KR | 10-2019-0011264 A | 2/2019 |
| KR | 10-2019-0051785 A | 5/2019 |
| KR | 10-2020-0005160 A | 1/2020 |
| WO | 2020/011815 A2 | 1/2020 |

OTHER PUBLICATIONS

Office Action dated Jun. 28, 2022 issued by the Japanese Patent Office in Japanese Application No. 2021-521347.
International Search Report dated Mar. 22, 2021 in International Application No. PCT/KR2020/018250.
Office Action dated May 24, 2021 issued by the Korean Patent Office in Korean Application No. 10-2020-0019997.
Communication dated Feb. 28, 2025 issued by the State Intellectual Property Office of the P.R. China in application No. 202080005642.4.

* cited by examiner

[Figure 1]
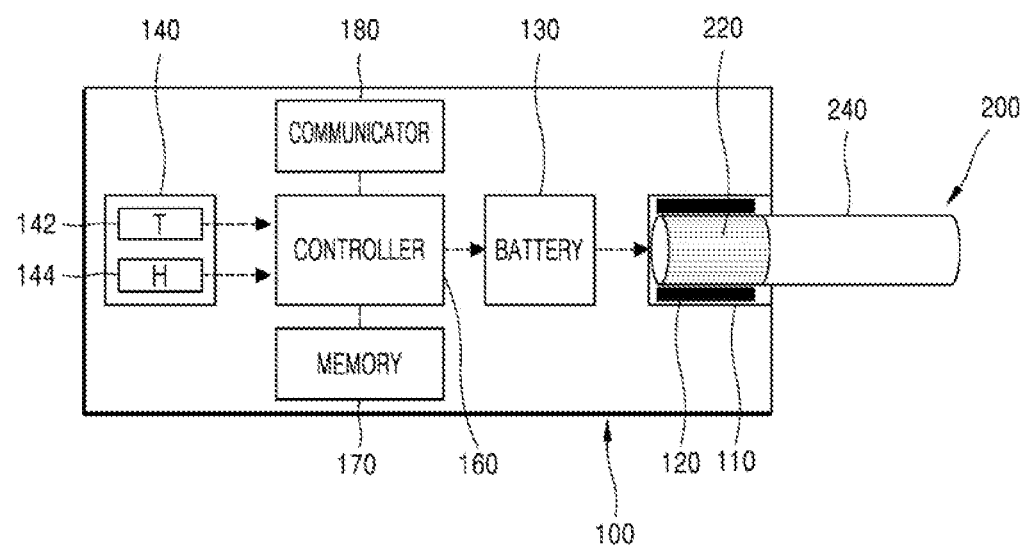
[Figure 2]
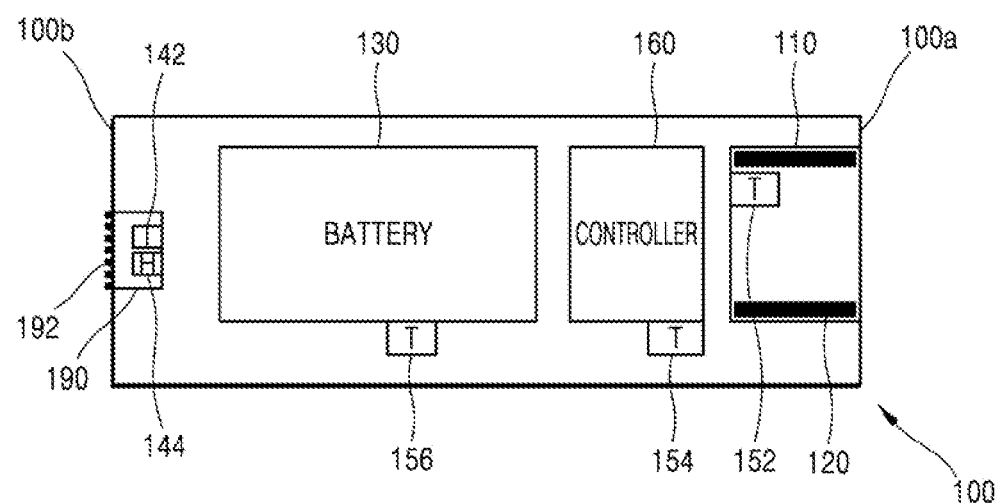

【Figure 3】
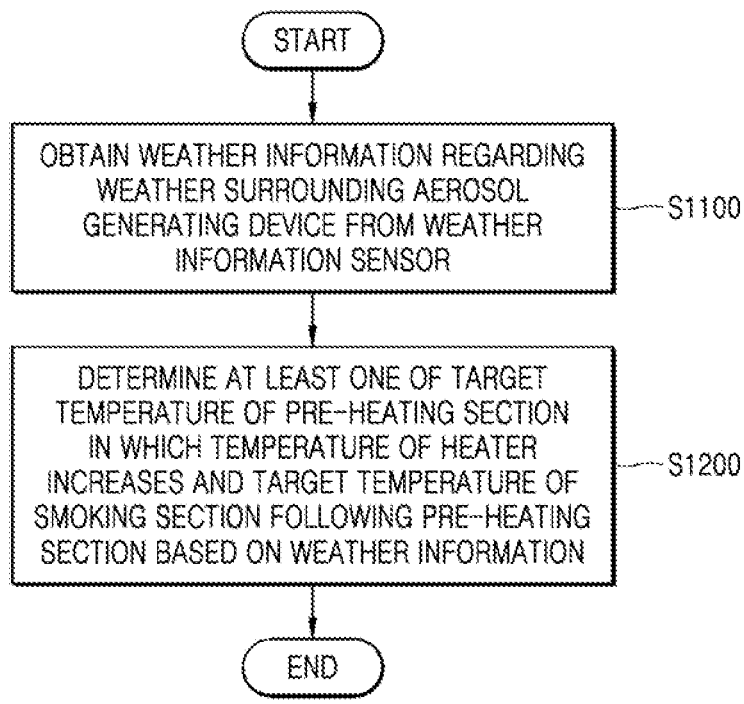
【Figure 4】
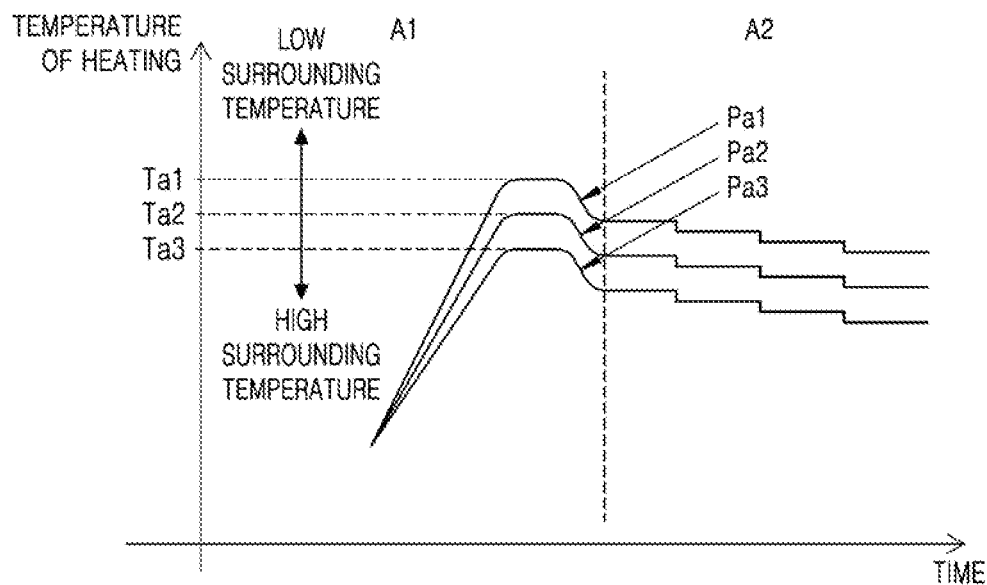

[Figure 5]
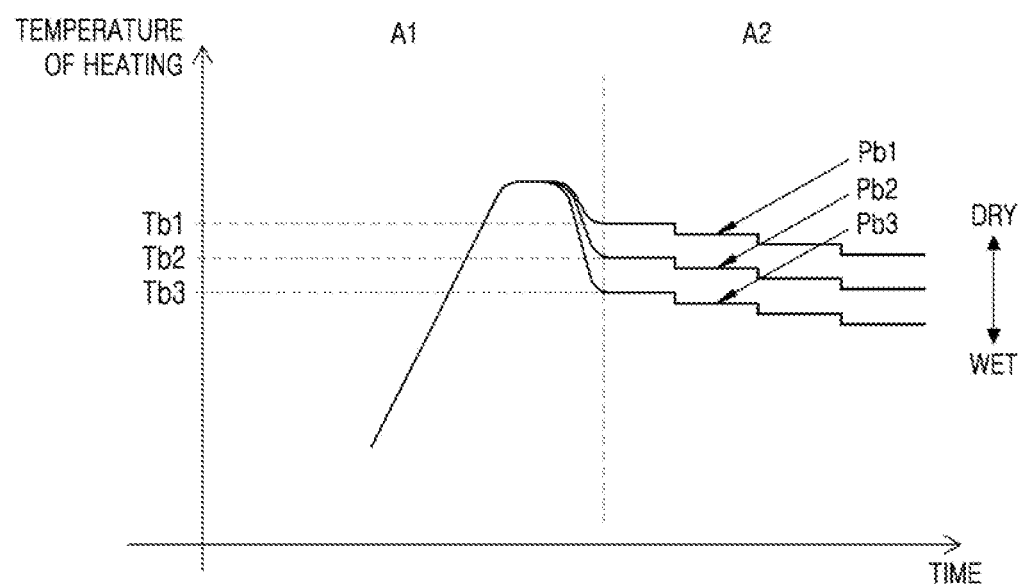

AEROSOL GENERATING DEVICE WITH A CONTROLLER SETTING HEATING TARGET TEMPERATURE BASED ON SENSOR OUTPUT AND METHOD FOR OPERATING THE SAME

TECHNICAL FIELD

Embodiments of the present disclosure relate to an aerosol generating device and an operation method for the same.

BACKGROUND ART

Recently, the demand for alternative methods of overcoming the shortcomings of general cigarettes has increased. For example, there is an increasing demand for a method of generating aerosols by heating an aerosol generating material in cigarettes, rather than by combusting cigarettes. Accordingly, studies on a heating-type cigarette or a heating-type aerosol generating device have been actively conducted.

A weather environment, including surrounding weather in which a smoking act is performed, is a factor that affects an amount of smoke generation and a degree of carbonization of a cigarette. Accordingly, when smoking is performed by using a cigarette in the related art, a smoking feeling provided through smoking may change depending on the surrounding weather environment.

DISCLOSURE

Technical Problem

When smoking is performed by using a cigarette in the related art, smoking feeling, which may change depending on a surrounding weather environment, is needed to be improved.

Technical Solution

To this end, an aerosol generating device of an embodiments of the present disclosure may be provided, and may sense surrounding weather information and apply different heating profiles according to the sensed surrounding weather information.

Technical problems to be solved by embodiments of the present disclosure are not limited to the above-described problems, and problems that are not mentioned will be clearly understood by those of ordinary skill in the art from the present disclosure and the accompanying drawings.

According to an embodiment, an aerosol generating device may be provided, the aerosol generating device including: a housing forming an exterior of the aerosol generating device, a heater configured to heat an aerosol generating article inserted through a first surface of the housing, a battery electrically connected to the heater, a weather information sensor exposed through a second surface of the housing and configured to measure weather information regarding weather surrounding the housing, and a controller configured to adjust power supplied from the battery to the heater, wherein the controller may be further configured to determine, based on the weather information, at least one of a target temperature of a pre-heating interval, in which a temperature of the heater increases, and a target temperature of a smoking interval following the pre-heating interval, and control an amount of power supplied from the battery to the heater such that the heater is heated according to the determined target temperature of the pre-heating interval and the target temperature of the smoking interval.

Advantageous Effects

Even when a surrounding weather environment, in which a smoking act is performed, changes, an amount of smoke and a degree of carbonization provided through an aerosol generating device may be maintained according to a preset profile. Accordingly, a user may be provided with a desired level of smoking feeling.

Effects of embodiments of the present disclosure are not limited thereto, and effects not mentioned will be clearly understood by those of ordinary skill in the art from the present disclosure and the accompanying drawings.

DESCRIPTION OF DRAWINGS

FIG. 1 is a structural diagram of an aerosol generating device and an aerosol generating article, according to an embodiment;

FIG. 2 is a structural diagram of an aerosol generating device according to another embodiment;

FIG. 3 is a flowchart of an operation method of an aerosol generating device, according to an embodiment;

FIG. 4 is a first graph of a heating profile of an aerosol generating device, according to an embodiment; and FIG. 5 is a second graph of a heating profile of an aerosol generating device, according to an embodiment.

BEST MODE

According to one or more embodiments, an aerosol generating device is provided. The aerosol generating device includes: a housing forming an exterior of the aerosol generating device; a heater configured to heat an aerosol generating article inserted through a first surface of the housing: a battery electrically connected to the heater; a weather information sensor exposed through a second surface of the housing and configured to measure weather information surrounding the housing; and a controller configured to adjust power supplied from the battery to the heater, wherein the controller is further configured to determine, based on the weather information, at least one from among a target temperature of a pre-heating interval in which a temperature of the heater increases, and a target temperature of a smoking interval following the pre-heating interval, and control an amount of the power supplied from the battery to the heater such that the heater is heated according to the at least one from among the target temperature of the pre-heating interval and the target temperature of the smoking interval that is determined.

According to an embodiment, the weather information sensor includes a temperature sensor configured to measure a surrounding temperature, and the controller is further configured to determine the target temperature of the pre-heating interval based on the surrounding temperature.

According to an embodiment, the controller is further configured to decrease the target temperature of the pre-heating interval based on the surrounding temperature increasing.

According to an embodiment, the aerosol generating device further includes a memory storing a plurality of profiles, in the pre-heating interval, in which target temperatures of the pre-heating interval are set differently, wherein the controller is further configured to select one from among the plurality of profiles in the pre-heating interval based on the surrounding temperature.

According to an embodiment, the weather information sensor includes a humidity sensor configured to measure a surrounding humidity, and the controller is further configured to determine the target temperature of the smoking interval based on the surrounding humidity.

According to an embodiment, the controller is further configured to decrease the target temperature of the smoking interval based on the surrounding humidity increasing.

According to an embodiment, the aerosol generating device further includes a memory storing a plurality of profiles, in the smoking interval, in which target temperatures of the smoking interval are set differently, wherein the controller is further configured to select one from among the plurality of profiles in the smoking interval based on the surrounding humidity.

According to an embodiment, a recessed space is formed on the second surface of the housing and accommodates the weather information sensor, and an opening of the recessed space is covered by a breathable mesh.

According to an embodiment, the first surface of the housing is located at a proximal end of the aerosol generating device that is configured to be towards a user when the user uses the aerosol generating device to generate aerosol, and the second surface of the housing is located, at a distal end of the aerosol generating device that is configured to be away from the user when the user uses the aerosol generating device to generate the aerosol.

According to an embodiment, the aerosol generating device further includes: a heating chamber configured to receive the aerosol generating article; and a temperature sensor arranged on a side of the controller facing the heating chamber and configured to measure a temperature of the controller.

According to an embodiment, the aerosol generating device further includes a temperature sensor arranged adjacent to the battery and configured to measure a temperature of the battery.

According to an embodiment, the aerosol generating device further includes: a position sensor configured to obtain position information about a current position; and a communicator configured to receive weather information of the current position from an external server, wherein the controller is further configured to determine a heating profile based on the weather information, of the current position, received through the communicator.

According to one or more embodiments, an operation method of an aerosol generating device that generates aerosols by heating an aerosol generating article by using a heater, is provided. The operation method is performed by the aerosol generating device and includes: measuring weather information regarding weather surrounding the aerosol generating device from a weather information sensor; determining, based on the weather information, at least one from among a target temperature of a pre-heating interval of a heating profile and a target temperature of a smoking interval following the pre-heating interval; and heating the heater according to the heating profile.

According to one or more embodiments, an aerosol generating system is provided. The aerosol generating system includes: an aerosol generating article that is a cigarette-type; and an aerosol generating device including: a heater, a battery, a weather information sensor configured to measure weather information, and a controller configured to determine, based on the weather information, at least one from among a target temperature of a pre-heating interval of a heating profile and a target temperature of a smoking interval following the pre-heating interval, and heat the aerosol generating article according to the heating profile.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used to describe the various embodiments of the present disclosure should be defined based on the meanings of the terms and the descriptions provided herein.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element is referred to as being "over," "above," "on," "below," "under," "beneath," "connected to" or "coupled to" another element, it can be directly over, above, on, below, under, beneath, connected or coupled to the other element or intervening elements may be present. In contrast, when an element is referred to as being "directly over," "directly above," "directly on," "directly below," "directly under," "directly beneath," "directly connected to" or "directly coupled to" another element, there are no intervening elements present.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Throughout the present disclosure, an aerosol generating device may be a device that uses an aerosol generating material to generate aerosols that may be directly inhaled into a user's lungs through the user's mouth. For example, the aerosol generating device may be a holder. Throughout the present disclosure, the term "puff" may mean a user's inhalation, and the inhalation may mean a situation in which aerosols are drawn to the user's oral cavity, nasal cavity, or lungs through the user's mouth or nose.

Hereinafter, embodiments of the present disclosure will be described more fully with reference to the accompanying drawings, such that one of ordinary skill in the art may easily work the present disclosure. Embodiments of the present disclosure may, however, be embodied in many different forms and should not be construed as being limited to the example embodiments set forth herein.

FIG. 1 is a structural diagram of an aerosol generating device 100 and an aerosol generating article 200, according to an embodiment.

Referring to FIG. 1, an aerosol generating system may include the aerosol generating device 100 and the aerosol generating article 200. In the aerosol generating system shown in FIG. 1, only some components of the present embodiment are shown. Therefore, it will be understood by one of ordinary skill in the art related to the present embodiment that other general-purpose components may be further included in the aerosol generating system, in addition to the components illustrated in FIG. 1.

The aerosol generating device 100 may vaporize an aerosol generating material included in the aerosol generating article 200 and generate aerosols by heating the aerosol generating article 200. The generated aerosols are delivered to a user through the user's inhalation. The aerosol generating device 100 may include a heating chamber 110, a heater 120, a battery 130, a weather information sensor 140, a controller 160, a memory 170, a communicator 180, or the like.

The heating chamber 110 may be a space into which the aerosol generating article 200 is inserted and the inserted aerosol generating article 200 is heated by the heater 120. The heating chamber 110 may be an empty space formed in a housing forming an exterior of the aerosol generating device 100. The aerosol generating material may be inserted into the heating chamber 110 or removed from the heating chamber 110 through an opening formed on one side of the housing.

The heating chamber 110 may be manufactured in a shape corresponding to the shape of the aerosol generating article 200. For example, when the aerosol generating article 200 has an elongated shape extending in one direction, the heating chamber 110 may have a cylindrical shape in which an empty space extending in the one direction is formed.

According to an embodiment, the heating chamber 110 may include an insulating material to prevent heat transferred from the heating chamber 110 from being discharged to the outside.

The heater 120 may heat the aerosol generating article 200 inserted into the heating chamber 110. The heater 120 may be heated by power supplied from the battery 130, and accordingly, the heater 120 may heat and vaporize the aerosol generating material.

According to an embodiment, when the aerosol generating article 200 is a cigarette-type, at least a portion of a cigarette including the aerosol generating material may be inserted into the aerosol generating device 100. The heater 120 may be located inside or outside the cigarette to heat the aerosol generating material.

According to an embodiment, when the aerosol generating article 200 is a cartridge-type, the aerosol generating material may be stored in a storage unit (not shown) of a cartridge (not shown). The storage unit may transfer the stored aerosol generating material to an atomizer (not shown) along a capillary wick by using surface tension. The heater 120 may be provided in an atomizer to heat the aerosol generating material.

The heater 120 may include all heaters which may be heated to a desired temperature for vaporizing aerosols. The desired temperature may be preset in the aerosol generating device 100 or may be set as a desired temperature by a user.

According to an embodiment, the heater 120 may be an electric resistive heater. For example, the heater 120 may include an electrically conductive track, and the heater 120 may be heated when currents flow through the electrically conductive track.

According to an embodiment, the heater 120 may be an induction-heating-type heater. In detail, the heater 120 may include an electrically conductive coil heating the aerosol generating material in an induction heating method, and a cigarette or a liquid cartridge may include a susceptor that may be heated by the heater 120, that is an induction-type heater.

FIG. 1 illustrates that the heater 120 is arranged outside the aerosol generating article 200, but is not limited thereto. For example, the heater 120 may include a tube-type heating element, a plate-type heating element, a needle-type heating element, or a rod-type heating element, and may heat the inside or the outside of the aerosol generating article 200, according to the shape of the heating element.

In addition, the aerosol generating device 100 may include a plurality of the heater 120. At this time, the plurality of the heater 120 may be arranged to be inserted into the aerosol generating article 200, or may be arranged outside the aerosol generating article 200. In addition, some of the plurality of the heater 120 may be arranged to be inserted into the aerosol generating article 200, and the others of the plurality of the heater 120 may be arranged outside the aerosol generating article 200. In addition, the shape of the heater 120 is not limited to the shape shown in FIG. 1, and may be manufactured in various shapes.

The weather information sensor 140 may measure information about weather conditions surrounding the aerosol generating device 100. The weather information sensor 140 may include sensors that measure various weather information such as temperature, humidity, wind speed, air volume, or the like. For example, the weather information sensor 140 may include a temperature sensor 142 and a humidity sensor 144.

The temperature sensor 142 may measure a surrounding temperature of the aerosol generating device 100. The surrounding temperature may be a temperature outside the aerosol generating device 100. The surrounding temperature is a temperature of an atmosphere at which aerosols generated from the aerosol generating article 200 in the aerosol generating device 100 is discharged. The temperature sensor 142 may be arranged outside the housing to measure the surrounding temperature, or may be located on a path through which external air is introduced.

The surrounding air is a factor that affects an amount of aerosols generation and a degree of carbonization of a tobacco material. When the surrounding temperature is high, properties of the tobacco material may be changed by heat to increase the degree of carbonization, and accordingly, aerosols generated from the aerosol generating device 100 may have an excessively burnt taste or a burnt flavor. When the surrounding temperature is low, the tobacco material is difficult to be sufficiently vaporized, and accordingly, the aerosols generated from the aerosol generating device 100 may not provide a rich smoking feeling.

The temperature sensor 142 may transmit a measured value of the surrounding temperature to the controller 160, and the controller 160 may determine a heating profile for heating the aerosol generating article 200 based on the surrounding temperature.

For example, the temperature sensor 142 may be a thermistor that uses a property in which resistance of a material changes according to temperature. Alternatively, the temperature sensor 142 may measure a temperature by using thermal expansion of a liquid material according to the temperature. Alternatively, the temperature sensor 142 may measure a temperature by using electromagnetic waves emitted according to a surface temperature.

The humidity sensor 144 may measure a surrounding humidity of the aerosol generating device 100. The surrounding humidity is a humidity of an atmosphere at which aerosols generated from the aerosol generating article 200 in the aerosol generating device 100 are discharged. The humidity sensor 144 may be arranged outside the housing to measure the surrounding humidity, or may be located on the path through which the external air is introduced.

The surrounding humidity is a factor that affects the amount of aerosols generation and the degree of carbonization of the tobacco material. When the surrounding humidity is high, aerosols vaporized from the aerosol generating material may aggregate with atmospheric water vapors to increase an amount of smoke. When the surrounding humidity is low, because an amount of water vapors in the atmosphere is small when the aerosol generating material is vaporized, the amount of smoke may be reduced.

The humidity sensor 144 may transmit a measured value of the surrounding humidity to the controller 160, and the controller may determine the heating profile for heating the aerosol generating article 200 based on the surrounding humidity.

For example, the humidity sensor 144 may measure the surrounding humidity by using numerical changes in weight, capacity, length, or the like, which are indicated when organic substances such as hair, leather, wood, or the like or chemical drying agents absorb water vapor in the atmosphere. The humidity sensor 144 may also be a psychrometer.

The controller 160 generally controls operations of the aerosol generating device 100. In detail, the controller 160 may control not only operations of the battery 130, the heater 120, and the weather information sensor 140, but also operations of other components included in the aerosol generating device 100. In addition, the controller 160 may also check a state of each of the components of the aerosol generating device 100 to determine whether or not the aerosol generating device 100 is able to operate.

The controller 160 may determine a heating profile based on surrounding weather information obtained from the weather information sensor 140. The controller 160 may adjust a heating intensity of the aerosol generating material by adjusting power supplied from the battery 130 to the heater 120 according to the heating profile.

The heating profile is a data set recording an amount of change in a particular value controlled over time when the aerosol generating article 200 is heated. For example, the heating profile may be a data set of an amount of power supplied from the battery 130 to the heater 120. Alternatively, for example, the heating profile may be a data set of a temperature value of the heater 120 that changes according to the power supplied to the heater 120. The heating profile may include a plurality of sections. For example, the heating profile may include a pre-heating interval, a smoking interval, a cooling section, or a combination thereof.

The controller 160 may select, from the memory 170, at least one most suitable heating profile from among a plurality of heating profiles based on the surrounding temperature and the surrounding humidity. In other words, the controller 160 may adjust some values of the heating profile based on the surrounding temperature and the surrounding humidity.

Accordingly, the aerosol generating device 100 may provide the user with an optimal smoking feeling determined by considering effects of the surrounding temperature and the surrounding humidity on the amount of aerosols generation and the degree of carbonization of the tobacco material. A particular embodiment, in which the controller 160 determines the heating profile based on the surrounding temperature and the surrounding humidity, will be described in more detail later with reference to FIGS. 3 and 4.

The controller 160 includes at least one processor. A processor may be implemented as an array of a plurality of logic gates or may be implemented as a combination of a general-purpose microprocessor and the memory 170 in which a program executable in the microprocessor is stored. It will be understood by one of ordinary skill in the art that the processor may be implemented in other forms of hardware.

The battery 130 supplies electric power used for the aerosol generating device 100 to operate. For example, the battery 130 may supply power such that the heater 120 may be heated, and may supply power required for the controller 160 to operate. The battery 130 may supply power to the weather information sensor 140. In addition, the battery 130 may supply power for operations of a display, a sensor, a motor, etc. mounted in the aerosol generating device 100.

According to an embodiment, the battery 130 may be electrically connected to an adapter, and the adapter may convert a direct current output from the battery 130 into an alternating current and output the same.

The memory 170 may receive and record information from components of the aerosol generating device 100, the components including the controller 160, the weather information sensor 140, the communicator 180, or the like. The memory 170 may provide, upon request, information to a component of the aerosol generating device 100, the component including the controller 160.

The memory 170 may store programs, software, or the like for driving the aerosol generating device 100 in a form of code instructions or the like. For example, the memory 170 may store at least one heating profile.

The memory 170 may include at least one type of storage medium from among a flash memory type, a hard disk type, a multimedia card micro type memory (for example, secure digital (SD) or extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, and an optical disk.

According to an embodiment, the aerosol generating system (e.g. the aerosol generating device 100) may include a position sensor. The position sensor may obtain position information about a current position of the aerosol generating device 100 through a global navigation satellite system (GNSS). The position sensor may include, for example, a global positioning system (GPS) system. The position sensor may receive position information from a satellite and process the position information to transmit the same to the controller 160.

The communicator 180 may transmit and receive information through communication with an external server and devices. The aerosol generating device 100 may access the Internet or perform short-range communication through the communicator 180. The aerosol generating device 100 may, through the communicator 180, receive update information on the heating profile and update information on a driving program of the aerosol generating device 100. According to embodiments, the communicator 180 may be a transmitter and/or a receiver which may include any one or combination of a digital modem, a radio frequency (RF) modem, a WiFi chip, and related software and/or firmware.

For example, the external server may include a server providing weather information of a particular position. In addition to the temperature and humidity information, the external server may provide various weather information including a rainfall probability, an amount of rainfall and UV index, a discomfort index, a heat index, a sensible temperature, atmospheric diffusion index, or the like. The aerosol generating device 100 may provide position information about a current position to the external server through the communicator 180, and may receive weather information including the surrounding temperature and surrounding humidity of the current position from the external server.

The controller 160 may determine the heating profile based on the weather information. The controller 160 may determine the heating profile by considering a surrounding temperature value and a surrounding humidity value which are measured through the temperature sensor 142 and the humidity sensor 144, and the weather information obtained through the external server. For example, the controller 160 may correct the surrounding temperature value and the surrounding humidity value which are measured through the temperature sensor 142 and the humidity sensor 144 by using the weather information obtained through the external server. For example, when operations of the temperature sensor 142 and the humidity sensor 144 are inaccurate, the controller 160 may determine the heating profile by considering only the weather information obtained through the external server.

The aerosol generating device 100 may further include general-purpose components in addition to the battery 130, the heater 120, the temperature sensor 142, and the humidity sensor 144. For example, the aerosol generating device 100 may include a display capable of outputting visual information and/or a motor configured to output haptic information, a charge terminal configured to charge the battery 130, or the like. For example, the motor may notify, through vibration, that heating of the heater 120 is completed. For example, the aerosol generating device 100 may include a light-emitting diode (LED) and may display an operating state of the heater 120 through the LED.

In addition, the aerosol generating device 100 may include at least one sensor (a puff detecting sensor, a cigarette insertion detecting sensor, or the like). The controller 160 may, through the puff detecting sensor, check the presence or absence of a user's puff and an intensity of a puff, and may count the number of puffs.

In addition, the aerosol generating device 100 may include an input unit (not shown). As a user input is received through the input unit, an operation of the aerosol generating device 100 may be controlled.

According to an embodiment, the aerosol generating article 200 may be a cigarette-type extending in one direction. The aerosol generating article 200 may include a tobacco rod 220 including the aerosol generating material, a cooling rod cooling aerosols, and a filter rod 240 filtering impurities, and the tobacco rod and the filter rod may be packaged via at least one wrapper.

The tobacco rod may include the aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. In addition, the aerosol generating material may include other additives, such as flavors, a wetting agent, and/or organic acid. In addition, a flavored liquid, such as menthol or a moisturizer, may be added to the aerosol generating material.

The tobacco rod may be manufactured in various forms. For example, the tobacco rod may be formed as a sheet or a strand. In addition, the tobacco rod may be formed as a pipe tobacco, which is formed of tiny bits cut from a tobacco sheet. Also, the tobacco rod may be surrounded by a heat conductive material. For example, the heat conductive material may be, but is not limited to, a metal foil such as aluminum foil. For example, the heat conductive material surrounding the tobacco rod may uniformly distribute heat to the tobacco rod, and thus, the heat conductivity applied to the tobacco rod may be increased and a taste of the tobacco may be improved. In addition, the heat conductive material surrounding the tobacco rod may function as a susceptor heated by the induction-heating-type heater 120. Here, although not illustrated in the drawings, the tobacco rod may further include an additional susceptor, in addition to the heat conductive material surrounding the exterior thereof.

The filter rod may include a cellulose acetate filter. Shapes of the filter rod are not limited. For example, the filer rod may include a cylinder-type rod or a tube-type rod having a hollow inside. In addition, the filter rod may include a recess-type rod. When the filter rod includes a plurality of segments, at least one of the plurality of segments may have a different shape.

According to another embodiment, the aerosol generating article 200 may be a cartridge-type including a liquid aerosol generating material. The aerosol generating article 200 may include a storage space in which the liquid aerosol generating material is accommodated, a wick transporting the aerosol generating material from the storage space, the heater 120 surrounding the wick and heating the aerosol generating material absorbed in the wick, a contact terminal connecting the heater 120 and the battery 130, or the like.

FIG. 2 is a structural diagram of the aerosol generating device 100 according to another embodiment.

Referring to FIG. 2, the aerosol generating device 100 may include the housing forming the exterior. The components of the aerosol generating device 100, such as the heater 120, the controller 160, the battery 130, or the like, may be accommodated in the housing. According to embodiments, the housing may be integrally manufactured or may be formed by a plurality of parts and assembled. The housing may extend in one direction and may be easily gripped with one hand.

The heating chamber 110 may be arranged on one side or one surface 100*a* of the housing. The aerosol generating article 200 may be inserted into the heating chamber 110. When using the aerosol generating device 100, the one surface 100*a* of the housing is a proximal end proximate to the user.

The temperature sensor 142 and the humidity sensor 144 may be arranged on the other side or other surface 100*b* of the housing that is opposite to the one side or the one surface 100*a* of the housing. The other side or the other surface 100*b* of the housing is a distal end apart from the user. The temperature sensor 142 and the humidity sensor 144 may be arranged on the other side 100*b* of the housing to measure the surrounding temperature and the surrounding humidity by minimizing effects of heating of the heating chamber 110. According to embodiments, only one of the temperature sensor 142 and the humidity sensor 144 may be arranged on the other side 100*b* of the housing.

A recessed space 190, which is an empty space inside the housing, may be formed on the other side 100*b* of the housing. Sensors including the temperature sensor 142 and the humidity sensor 144 may be accommodated in the recessed space 190. According to embodiments, only one of the temperature sensor 142 and the humidity sensor 144 may be accommodated in the recessed space 190.

The recessed space 190 may protect the temperature sensor 142 and the humidity sensor 144 accommodated therein. External air may be introduced in the recessed space 190 through an opening of the recessed space 190, and the temperature sensor 142 and the humidity sensor 144 may measure the surrounding temperature and the surrounding humidity.

According to an embodiment, the opening of the recessed space 190 may be covered by a mesh 192, which is breathable. The external air may pass through the mesh 192 and be introduced in the recessed space 190. The mesh 192 may block foreign materials from invading into the recessed space 190.

The temperature sensor 142 and the humidity sensor 144 arranged in the recessed space 190 may be connected to the same sensor controller to be provided in a single sensor assembly. The sensor controller of the sensor assembly may be commonly connected to the temperature sensor 142 and the humidity sensor 144, and the sensor controller may receive both of the surrounding temperature value and the surrounding humidity value. The sensor controller may transmit the surrounding temperature value and the surrounding humidity value to the controller 160. Accordingly, a simple and compact packaging is possible, and power consumption may be saved.

According to an embodiment, the aerosol generating device 100 may include a temperature sensor 152 that measures a temperature in the heating chamber 110. Alternatively, the temperature sensor 152 may measure a temperature of the heater 120 based on a change in a resistance value.

The aerosol generating device 100 may monitor whether the heating chamber 110 or the heater 120 is heated to a target temperature according to the heating profile by measuring a temperature in the heating chamber 110 through the temperature sensor 152.

The temperature of the heating chamber 110 or the heater 120 measured by the temperature sensor 152 is transmitted to the controller 160. The controller 160 may adjust an amount of power such that a temperature value of the heating chamber 110 or the heater 120 matches a target temperature value of the heating profile. When the temperature value of the heating chamber 110 or the heater 120 and the target temperature value of the heating profile are outside of a predetermined range, the controller 160 may determine the heating chamber 110 or the heater 120 is overheated and stop the heating profile or operate an emergency heating profile that lowers a heating intensity.

According to an embodiment, the aerosol generating device 100 may include a temperature sensor 154 measuring a temperature of the controller 160 or around the controller 160. As the aerosol generating material is heated in the heating chamber 110, heat in the heating chamber 110 may be transferred to the controller 160. The temperature sensor 154 may measure and monitor the temperature of the controller 160 by considering characteristics of an electronic device vulnerable to heat.

The temperature of the controller 160 measured by the temperature sensor 154 may be transmitted to the controller 160, and when a temperature value of the controller 160 is outside of a predetermined range, the controller 160 may determine that the controller 160 is overheated and stop the heating profile or operate the emergency heating profile that lowers a heating intensity.

The temperature sensor 154 may be arranged between the heating chamber 110 and the controller 160. The temperature sensor 154 may be arranged on one side of the controller 160 facing the heating chamber 110.

According to an embodiment, the aerosol generating device 100 may include a temperature sensor 156, arranged close to the battery 130, that measures a temperature of the battery 130 or around the battery 130. As the aerosol generating material is heated in the heating chamber 110, the heat in the heating chamber 110 may be transferred to the battery 130. The temperature sensor 156 may measure and monitor the temperature of the battery 130 to prevent explosion of the battery 130 that may occur when the battery 130 is overheated.

The temperature of the battery 130 measured by the temperature sensor 156 may be transmitted to the controller 160, and when a temperature value of the battery 130 is out of a predetermined range, the controller 160 may determine that the battery 130 is overheated and stop the heating profile or operate the emergency heating profile that lowers a heating intensity. FIG. 3 is a flowchart of an operation method of the aerosol generating device 100 according to an embodiment, and FIGS. 4 and 5 are graphs of an example heating profile of the aerosol generating device 100, according to an embodiment.

The operation method of the aerosol generating device 100 includes an operation method in which the aerosol generating device 100 selects and directly uses at least one of a plurality heating profiles stored in the memory 170, an operation method of autonomously modifying a portion of the heating profiles stored in the memory 170, and an operation method of generating the heating profiles to be stored in the memory 170.

Referring to FIG. 3, the aerosol generating device 100 may obtain the surrounding weather information from the weather information sensor 140 (S1100). Contents of the weather information sensor 140 described with respect to FIGS. 1 and 2 may be applied to an operation S1100, but is not limited thereto.

The weather information sensor 140 includes the temperature sensor 142 measuring the surrounding temperature and the humidity sensor 144 measuring the surrounding humidity.

Then, the aerosol generating device 100 may determine at least one of a temperature of a pre-heating interval of the heating profile and a target temperature of a smoking interval, according to the surrounding weather information (S1200). This will be described with reference to FIGS. 4 and 5.

Referring to FIGS. 4 and 5, the heating profile may include a plurality of sections. For example, the heating profile may be formed by pre-heating interval A1, a smoking interval A2, a cooling section (not shown), or a combination thereof.

The heating profile may include the pre-heating interval A1 in which the temperature of the heater 120 increases. In the pre-heating interval A, the temperature of the heater 120 may rise from room temperature to a target temperature (e.g. Ta1, Ta2, or Ta3) which is a temperature at which the aerosol generating material is easily vaporized. According to embodiments, in the pre-heating interval A1, the temperature of the heater 120 may decrease by a predetermined range after reaching the target temperature (e.g. Ta1, Ta2, or Ta3).

The heating profile may include the smoking interval A2 following the pre-heating interval A1. In the smoking interval A2, a sufficient amount of the aerosol generating material may be vaporized to provide the user with a rich smoking feeling.

In the smoking interval A2, the temperature of the heater 120 may be generally reduced. For example, the smoking interval A2 may include a maintenance section in which the temperature of the heater 120 is maintained for a predetermined time and a descending section in which the temperature of the heater 120 decreased by a predetermined range. In the smoking interval A2, the temperature of the heater 120 may gradually or stepwise decrease according to a combination of the maintenance section and the descending section.

Although not illustrated in FIGS. 4 and 5, the heating profile may include, following the smoking interval A2, a cooling section in which the temperature of the heater 120 decreases. In the cooling section, as generation of aerosols is completed, the temperature of the heater 120 may be cooled to room temperature or a particular temperature.

Referring to FIG. 4, the aerosol generating device 100 may determine the target temperature (e.g. one of target temperatures Ta1, Ta2, or Ta3) in of the pre-heating interval A1 based on the surrounding temperature. The surrounding temperature is a factor that affects the amount of aerosols generation and the degree of carbonization of a tobacco material. When the surrounding temperature is high, the properties of the tobacco material may be changed by heat to increase the degree of carbonization, and accordingly, aerosols generated from the aerosol generating device 100 may have an excessively burnt taste or a burnt flavor. When the surrounding temperature is low, the tobacco material is difficult to be sufficiently vaporized, and accordingly, the aerosols generated from the aerosol generating device 100 may not provide a rich smoking feeling.

The pre-heating interval A1 is a section determining a temperature at which the aerosol generating material is heated by increasing the temperature of the heater 120, and the target temperature of the pre-heating interval A1 is a factor affecting the degree of carbonization of the tobacco material. When the target temperature of the pre-heating interval A1 is above a predetermined range, the tobacco material may be carbonized and have a burnt taste or a burnt flavor. When the target temperature is less than a predetermined range, the tobacco material is difficult to provide a rich smoking feeling.

Accordingly, the aerosol generating device 100 may adjust the degree of carbonization of the tobacco material within an optimum range by adjusting the target temperature of the pre-heating interval A1 based on the surrounding temperature. For example, the aerosol generating device 100 may decrease the target temperature of the pre-heating interval A1 as the surrounding temperature increases. Further, the aerosol generating device 100 may increase the target temperature of the pre-heating interval A1 as the surrounding temperature decreases.

The memory 170 may store a plurality of profiles Pa1, Pa2, and Pa3 in which target temperatures Ta1, Ta2, and Ta3 of the pre-heating interval A1 are differently set. The controller 160 may select at least one of the plurality of profiles Pa1, Pa2, and Pa3 from the memory 170 based on the surrounding temperature. When the surrounding temperature is equal to or greater than a predetermined temperature value, the controller 160 may select the profile Pa3 having a low target temperature Ta3 of the pre-heating interval A1 from among the plurality of profiles Pa1, Pa2, and Pa3. When the surrounding temperature is less than a predetermined temperature value, the controller 160 may select the profile Pa1 having a high target temperature Ta1 of the pre-heating interval A1 from among the plurality of profiles Pa1, Pa2, and Pa3.

Referring to FIG. 5, the aerosol generating device 100 may determine a target temperature (e.g. one of target temperatures Tb1, Tb2, Tb3) of the smoking interval A2 based on the surrounding humidity. The controller 160 may decrease the target temperature of the smoking interval A2 as the surrounding humidity increases. Further, the controller 160 may increase the target temperature of the smoking interval A2 as the surrounding humidity decreases.

The surrounding humidity is a factor that affects the amount of aerosols generation and the degree of carbonization of the tobacco material. When the surrounding humidity is high, aerosols vaporized from the aerosol generating material may aggregate with atmospheric water vapors to increase the amount of smoke. When the surrounding humidity is low, because the amount of water vapors in the atmosphere is small when the aerosol generating material is vaporized, the amount of smoke may be reduced.

The smoking interval A2 is a section for generating aerosols, and the target temperature (e.g. one of target temperatures Tb1, Tb2, Tb3) of the smoking interval A2 is a factor that affects the amount of aerosols generation. When the target temperature of the smoking interval A2 is equal to or greater than a predetermined range, an amount or heat energy supplied increases, and accordingly, the amount of aerosols generation and the amount of smoke may increase. When the target temperature of the smoking interval A2 is less than a predetermined range, the amount of heat energy supplied decreases, and accordingly, the amount of aerosols generation and the amount of smoke may decrease.

Therefore, the aerosol generating device 100 may adjust the amount of aerosols generation within an optimal range by adjusting the target temperature of the smoking interval A2 based on the surrounding humidity. For example, the aerosol generating device 100 may decrease the target temperature of the smoking interval A2 as the surrounding humidity increases. Further, the aerosol generating device 100 may increase the target temperature of the smoking interval A2 as the surrounding humidity decreases.

The memory 170 may store a plurality of profiles Pb1, Pb2, and Pb3 in which target temperatures Tb1, Tb2, and Tb3 of the smoking interval A2 are differently set. The controller 160 may select at least one of the plurality of profiles Pb1, Pb2, and Pb3 from the memory 170 based on the surrounding humidity. When the surrounding humidity is equal to or greater than a predetermined humidity, the controller 160 may select the profile Pb3 having a low target temperature Tb3 of the smoking interval A2 from among the plurality of profiles Pb1, Pb2, and Pb3. When the surrounding humidity is less than a predetermined humidity of the controller 160, the controller 160 may select the profile Pb1 having a high target temperature Tb1 of the smoking interval A2 from among the plurality of profiles Pb1, Pb2, and Pb3.

Accordingly, the aerosol generating device 100 may determine characteristics of a heating profile, such as the target temperature (e.g. one of target temperatures Ta1, Ta2, Ta3) of the pre-heating interval A1 and the target temperature (e.g. one of target temperatures Tb1, Tb2, Tb3) of the smoking interval A2, based on the surrounding weather information including the surrounding temperature and surrounding humidity. Accordingly, the aerosol generating device 100 may provide an optimal smoking feeling even when there is a change in the surrounding weather information.

While example embodiments of the present disclosure have been particularly shown and described, it will be understood by those skilled in the art that various changes in form and details may be made therein without departing from the scope of the inventive concept.

The invention claimed is:

1. An aerosol generating device comprising:
   a housing forming an exterior of the aerosol generating device;
   a heater configured to heat an aerosol generating article inserted through a first surface of the housing during a pre-heating interval and a smoking interval following the pre-heating interval;
   a battery electrically connected to the heater;
   a weather information sensor exposed through a second surface of the housing and configured to measure weather information including a surrounding temperature and a surrounding humidity of the housing; and
   a controller configured to adjust power supplied from the battery to the heater,
   wherein the controller is further configured to determine, based on the weather information, a target temperature of the pre-heating interval in which a temperature of the heater increases and a target temperature of the smoking interval, and control an amount of the power supplied from the battery to the heater such that the heater is heated according to the target temperature of the pre-heating interval and the target temperature of the smoking interval that is determined, and
   wherein the target temperature of the pre-heating interval is determined based on the measured surrounding temperature and not based on the surrounding humidity to adjust a degree of carbonization of a tobacco material within the aerosol generating article, and the target temperature of the smoking interval is determined based on the measured surrounding humidity and not based on the surrounding temperature to adjust an amount of aerosols generation.

2. The aerosol generating device of claim 1, wherein the weather information sensor comprises a temperature sensor configured to measure the surrounding temperature.

3. The aerosol generating device of claim 2, wherein the controller is further configured to decrease the target temperature of the pre-heating interval based on the surrounding temperature increasing.

4. The aerosol generating device of claim 2, further comprising a memory storing a plurality of profiles, in the pre-heating interval, in which target temperatures of the pre-heating interval are set differently,
   wherein the controller is further configured to select one from among the plurality of profiles in the pre-heating interval based on the surrounding temperature.

5. The aerosol generating device of claim 1, wherein the weather information sensor comprises a humidity sensor configured to measure the surrounding humidity.

6. The aerosol generating device of claim 5, wherein the controller is further configured to decrease the target temperature of the smoking interval based on the surrounding humidity increasing.

7. The aerosol generating device of claim 5, further comprising a memory storing a plurality of profiles, in the smoking interval, in which target temperatures of the smoking interval are set differently,
   wherein the controller is further configured to select one from among the plurality of profiles in the smoking interval based on the surrounding humidity.

8. The aerosol generating device of claim 1, wherein a recessed space is formed on the second surface of the housing and accommodates the weather information sensor, and an opening of the recessed space is covered by a breathable mesh.

9. The aerosol generating device of claim 1, wherein when the aerosol generating device faces upwards, the first surface of the housing corresponds to an upper side of the aerosol generating device and the second surface of the housing corresponds to a bottom side of the aerosol generating device.

10. The aerosol generating device of claim 1, further comprising:
    a heating chamber configured to receive the aerosol generating article; and
    a temperature sensor arranged on a side of the controller facing the heating chamber and configured to measure a temperature of the controller.

11. The aerosol generating device of claim 1, further comprising a temperature sensor arranged adjacent to the battery and configured to measure a temperature of the battery.

12. The aerosol generating device of claim 1, further comprising:
    a position sensor configured to obtain position information about a current position; and
    a communicator configured to receive weather information of the current position from an external server,
    wherein the controller is further configured to determine a heating profile based on the weather information, of the current position, received through the communicator.

13. An operation method of an aerosol generating device that generates aerosols by heating an aerosol generating article by using a heater, the operation method performed by the aerosol generating device and comprising:
    measuring weather information including a surrounding temperature and a surrounding humidity of the aerosol generating device from a weather information sensor;
    determining, based on the weather information, a target temperature of a pre-heating interval of a heating profile and a target temperature of a smoking interval following the pre-heating interval; and
    heating the heater according to the heating profile during the pre-heating interval and the smoking interval,
    wherein the target temperature of the pre-heating interval is determined based on the measured surrounding temperature and not based on the surrounding humidity to adjust a degree of carbonization of a tobacco material within the aerosol generating article, and the target temperature of the smoking interval is determined based on the measured surrounding humidity and not based on the surrounding temperature to adjust an amount of aerosols generation.

14. An aerosol generating system comprising:
    an aerosol generating article that is a cigarette-type; and
    an aerosol generating device including:
    a heater configured to heat the aerosol generating article during a pre-heating interval and a smoking interval following the pre-heating interval,
    a battery,
    a weather information sensor configured to measure weather information including a surrounding temperature and a surrounding humidity of the aerosol generating device, and
    a controller configured to determine, based on the weather information, a target temperature of the pre-heating interval of a heating profile and a target temperature of the smoking interval following the pre-heating interval, and control the heater to heat the aerosol generating article according to the heating profile, wherein the target temperature of the pre-heating interval is determined based on the measured surrounding temperature and not based on the surrounding humidity to adjust a degree of carbonization of a tobacco material within the aerosol generating article, and the target temperature of the smoking interval is determined based on the measured surrounding humidity and not based on the surrounding temperature to adjust an amount of aerosols generation.

* * * * *